Sept. 8, 1970            F. B. YOUNG            3,527,494
WELL FISHING TOOL
Filed June 6, 1968            2 Sheets-Sheet 2
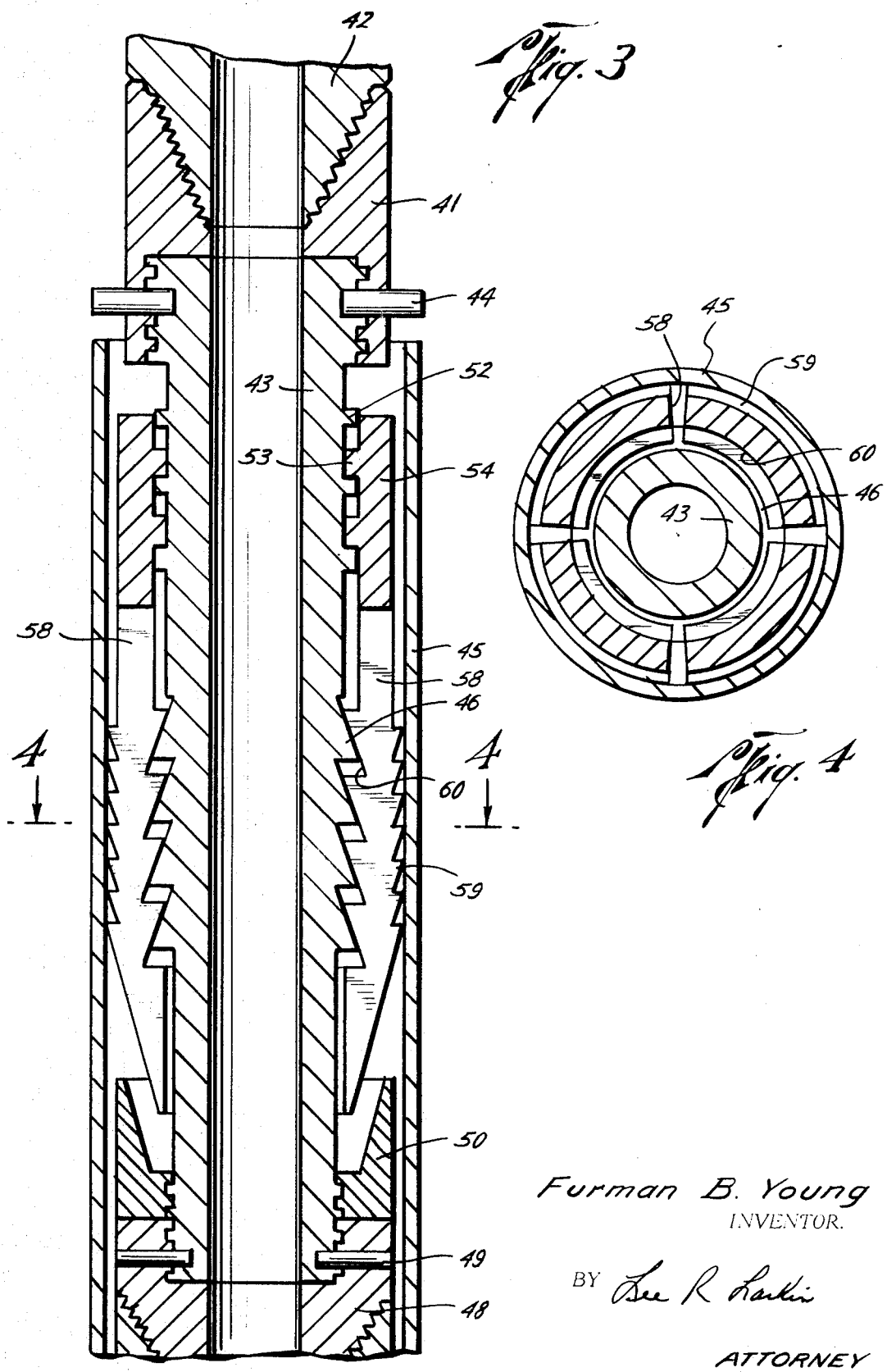
Furman B. Young
INVENTOR.
BY Lee R. Larkin
ATTORNEY

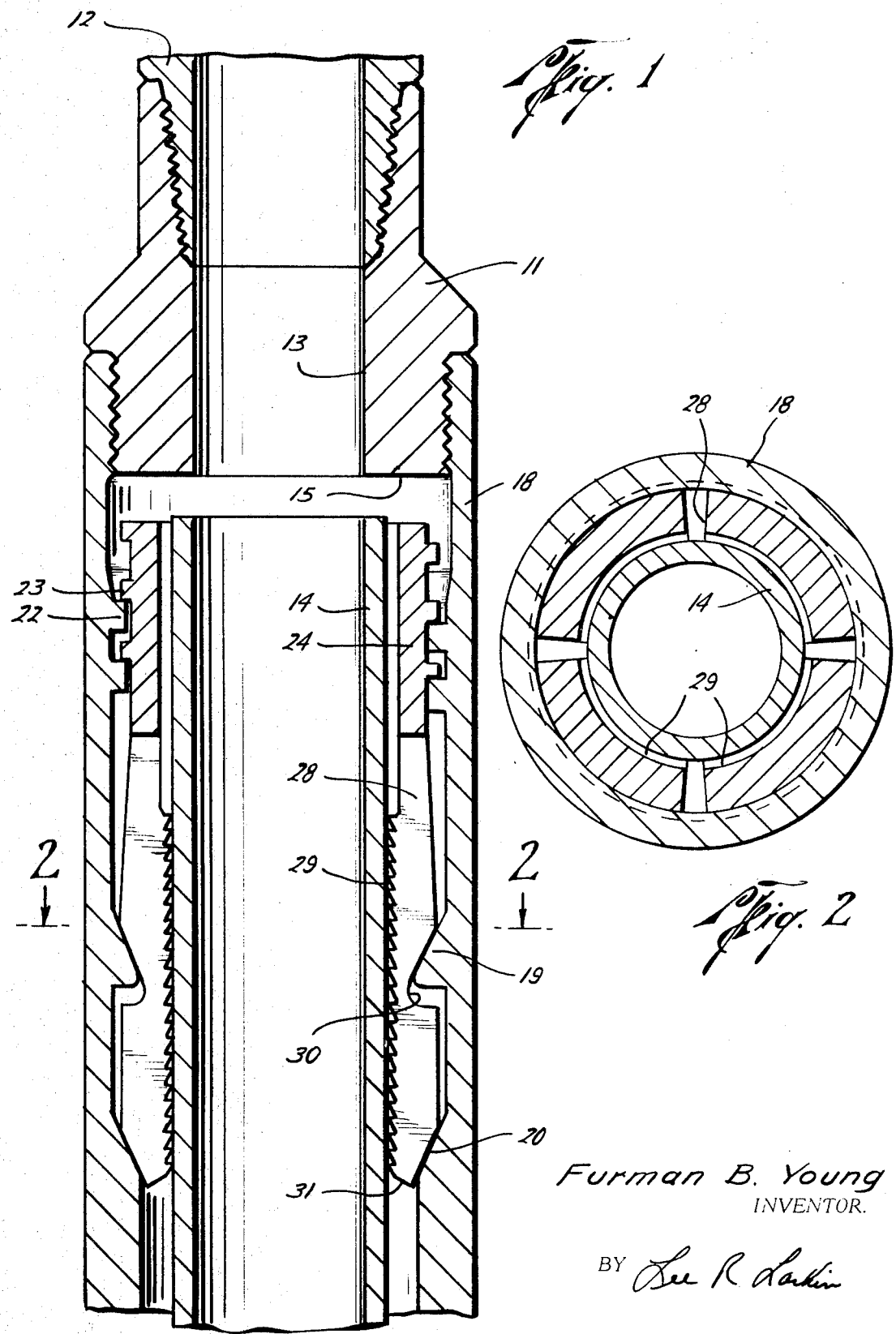

United States Patent Office 3,527,494
Patented Sept. 8, 1970

3,527,494
WELL FISHING TOOL
Furman B. Young, 1134 Graystone Drive,
Shreveport, La. 71107
Filed June 6, 1968, Ser. No. 742,115
Int. Cl. E21b *31/02;* E21c *19/00*
U.S. Cl. 294—86.25
10 Claims

ABSTRACT OF THE DISCLOSURE

A well fishing tool for retrieving a fish, such as stuck or dropped pipe, from a well bore. The invention includes fishing tools of both over-shoot and spear type. The tool is arranged for connection to the lower end of a string of pipe for lowering into the well bore and for imparting relative rotation to certain portions thereof to effect engagement of the tool with the fish. It is particularly arranged to control the extent of wedging of the slips of the fishing tool with the fish, to thereby prevent rupture or breaking of the fish, which would further compound the fishing operation. It is also arranged such that the tool may be disengaged from the fish while it remains in the well bore, should that become necessary.

---

This invention relates to a well fishing tool. The invention includes both over-shoot and spear type embodiments of well tools, which are adapted for connection to a string of well pipe to thereby effect lowering of the tool into the well bore into engagement with the fish pipe and for relative rotation of certain parts associated therewith.

There are many examples of well fishing tools in the prior art, none of which have been fully successful for various reasons. When recovering a pipe from a well bore, which pipe has either been stuck or otherwise lost in the well bore, such pipe is commonly referred to as a fish. In order to connect onto the upper end of the fish, some tool must be lowered into the well bore and manipulated such that it can easily and quickly attach itself thereto in such a manner as to recover the pipe without doing further substantial damage to the fish. In the conventional operation, and in the case of stuck pipe, for example, a conventional jar may be attached to the drill string to effect jarring action of the fishing tool and the fish connected thereto or engaged thereby. Sometimes it may take as much as several hours to effect freeing of a stuck portion of pipe. During such jarring actions, unless the extent of engagement of the well tool with the fish is controlled within predetermined limits, there is a tendency for spear type well tools to split the fish pipe and for over-shoot type fishing tools to crush the fish pipe.

It is therefore an object of this invention to provide an improved fishing tool which overcomes the aforesaid problems, which is easy to manipulate, and which can be readily disengaged from the fish in the event that is desired.

Briefly stated, the invention is for a fishing tool, including the combination of a cam member having means for attachment to a string of pipe for lowering into a well and rotation thereby. The cam member is provided with at least one first cam surface along one portion thereof and a threaded portion having a first set of helical threads spaced axially from the first cam surface. The tool also includes a slip ring threadably connected to the threaded portion of the cam member by a second set of helical threads, with the first and second sets of threads mating in a slack fitting relationship. This slack fitting relationship is preferably achieved by having thread grooves of wider axial dimension than the thread lands on at least one set of the helical threads.

The tool also includes a plurality of slips connected to the slip ring, with the slips having at least one secured cam surface arranged for generally radial camming engagement by a first cam surface, and a gripping surface on the side radially opposite from the second cam surface. The gripping surfaces are arranged to frictionally engage the fish to be recovered from the well. The slips are engaged with the fish by lowering the tool into the well with the gripping surface of the slip positioned adjacent a section of the fish and cammed into wedging contact therewith by rotation of the string of pipe supporting the tool. The slack fitting threads control the extent of wedging of the slips with the fish during a fishing operation, such as when a jarring action is imposed on the drill string, tool, and fish by conventional jar.

In the preferred embodiments, the cam members are generally tubular shaped and the mating threads are preferably square type threads and of a relatively large dimension. In the over-shoot embodiment of the tool, the first cam surface is provided on the inside thereof and the slip ring and slips are also mounted inside the cam member. In the spear configuration the first cam surface, the slips, and slip ring are located on the outside thereof.

Certain embodiments of the invention may include stop means for engaging the upper end of the fish during lowering of the tool in the well for thereby positioning the tool adjacent the upper end of the fish. In the preferred embodiments, the slips are resiliently connected to the slip ring and spring into contact with the fish when the tool is lowered into the well.

The invention may be further understood by reference to the drawings wherein like numbers refer to like parts and in which:

FIG. 1 is a generally vertical central sectional view of one preferred form of the invention of the over-shoot type, showing it engaged with a fish.

FIG. 2 is a cross section generally taken along line 2—2 of FIG. 1.

FIG. 3 is a generally vertical central sectional view of another preferred embodiment of the invention of the spear type showing it engaged with a fish.

FIG. 4 is a cross sectional view generally taken along line 4—4 of FIG. 3.

Referring now to FIGS. 1 and 2 in particular, the over-shoot embodiment of the tool will be described first. The tool includes sub-connector 11 having internal threads at the upper end thereof which engage the threads on the pin end 12 of the lowermost length of a string of pipe on which the tool of this invention is mounted. When the fishing operation is to be commenced, the string of pipe to which sub-connector 11 is connected is lowered into the well bore with the tool attached thereto as shown. Sub-connector 11 has internal bore 13 of substantially the same diameter of that of the fish to be recovered which is indicated as fish pipe 14 and of a size substantially the same as that of the string of pipe to which the tool is attached.

Sub-connector 11 is provided with a thickened lower end forming a stop abutment 15 which is arranged to engage the upper end of fish pipe 14 to limit the downward movement of the tool when the fish pipe 14 is engaged. Sub-connector 11 also has external threads about the lower end thereof, which are arranged to engage internal threads on a generally tubular shaped cam member in a form of a cam sleeve 18 which depends downwardly therefrom as shown. Cam sleeve 18 is provided with a pair of annular camming surfaces on the internal surface thereof in the form of annular inwardly and downwardly tapered camming ramp 19 forming a generally radially inwardly facing camming surface. Cam sleeve 18 also has provided therebelow with another annular camming surface in the form of camming ramp 20, the purposes of which will be explained hereinafter.

Cam sleeve 18 also has a threaded portion spaced axially from camming ramps 19 and 20. This threaded portion is in the form of a set of relatively large, generally square helical right-hand threads 22 which are arranged to mate in a slack fitting relationship with a set of relatively large, generally square helical right-hand threads 23 provided on slip ring 24 mounted inside cam sleeve 18. It is to be understood that threads 23 are also of rather large configuration, are generally square type, and have a helix matching that of threads 22. As shown in FIG. 1, the lands of the set of threads 23 are substantially larger in axial length than the grooves thereof. With respect to threads 22, the lands thereof are substantially the same axial length as the grooves. Hence, there is provided a slack fit between the two sets of threads. By relative rotation of cam sleeve 18 relative to slip ring 24, axial movement is affected therebetween. However, in the absence of rotational movement therebetween, there is still some axial movement permitted by the slackness of the fit between the sets of threads 22 and 23, the purpose of which will be explained hereinafter.

Slip ring 24 has attached thereto and depending therefrom four resilient slips 28 which are dimensioned such that they can spring over the upper end of fish pipe 14 when the tool is lowered in the well bore. Slips 28 each have provided on the radially inward sides thereof a plurality of wicker teeth 29 forming gripping surfaces for engagement with the fish pipe 14. Each of the slips 28 also has at least one second camming surface on the radially outward side thereof for engagement and radially inward camming by the camming surfaces of cam sleeve 18 described above. One of these camming surfaces on slips 28 is in the form of a generally tapered and circumferential slot 30 which is arranged to be engaged by camming ramp 19.

Slips 28 also have another second camming surface in the form of downwardly and radially inwardly tapered portion 31 which form a camming surface for engagement by camming ramp 20. Slips 28 are also provided with a generally inwardly and upwardly tapered shoulder 31 which facilitates passage of the slips 28 over the upper end of fish pipe 14 during the initial lowering of the well tool into engagement therewith.

In operation of the tool, it is mounted on the lower end of a string of drill pipe as shown in FIG. 1. It is thereafter lowered into the well bore where the fish pipe 14 is situated. During the lowering operation, shoulders 31 of slips 28 cause the slips 28 to spring over the outside surface of the fish pipe 14. Stop abutment 15 of sub-connector 11 limits the downward movement of the tool relative to fish pipe 14 initially.

Thereafter, the pipe string to which sub-connector 11 is connected is then rotated in a counter-clockwise direction, causing cam sleeve 18 to move up axially relative to slip ring 24, since the slips 28 are frictionally engaging fish pipe 14. During the axial movement of slip ring 24 relative to cam sleeve 18, camming ramps 19 and 20 engage slot 30 and the tapered portion 31 of slips 28 and cam them radially inward into wedging engagement with fish pipe 14. Rotation of cam sleeve 18 is continued until slips 28 are positively wedged with fish pipe 14. Thereafter, when the pulling force is exerted on the tool by taking up on the string of pipe suspending the tool in the well bore, further wedging of the slips 28 against fish pipe 14 is limited by the extent of the slackness of the fit between sets of threads 22 and 23. In other words, the maximum extent of wedging is defined by the point at which the lower surfaces of the lands of threads 23 contact the upper surfaces of the lands of threads 22. Hence, any pulling or subsequent jarring action is kept from crushing the fish pipe 14. In addition, the amount of wedging provided by the slackness of the fit between threads 22 and 23 insures adequate wedging of the slips 28 with the fish pipe 28 during any pulling or jarring of the tool to effect dislodgement of the fish pipe 14, which in some instances can be carried on for several hours.

If, at any time, it becomes desirable and/or necessary to disengage the tool from the fish, such disengagement can be effected by rotating the suspension pipe and cam sleeve 18 in a clockwise direction, thereby permitting slips 28 to become disengaged from the previously wedging position and withdrawn from over the fish pipe 14. Again, the slackness of the fit of threads 22 and 23 facilitates this disconnecting operation.

Referring now to FIGS. 3 and 4, the spear embodiment of the invention will be described in detail. In this embodiment, sub-connector 41 is provided with internal threads on the upper end thereof for connection to the pin end 42 of the lowermost portion of a string of pipe used to run the tool into the well bore. Connector 41 is provided with internal threads on the lower end thereof which are arranged to engage external threads on the upper end of expander or cam mandrel 43 which is generally cylindrical or tubular in form. Cam mandrel 43 is held in engagement with sub-connector 41 by a plurality of stop and lock pins 44 which extend radially outward a sufficient distance to engage the upper end of a fish pipe 45 which is to be recovered from the well bore. Mandrel 43 has a plurality of annular cam ramps 46 intermediate the ends thereof which present generally radially outward facing camming surfaces.

The lower end of cam mandrel 43 has mounted thereon as by threading a connector 48 which is secured thereon by lock pins 49 passing transversely therethrough and engaging mandrel 43 as shown. Immediately above connector 48 and threadably mounted on mandrel 43 is a generally cup shaped guide sleeve 50.

Near the upper end thereof, mandrel 43 is provided with a set of generally large square external helical right-hand threads 52 wherein the lands are substantially of less axial widths than the grooves as shown. Threads 52 are arranged to mate with another set of relatively large generally square helical right-hand threads 53 in slack fitting relationship, with threads 53 being provided on the inside surface of slip ring 54. Slip ring 54 is dimensioned such that it moves freely inside of fish pipe 45.

Slip ring 54 has attached thereto and depending therefrom four resilient slips 58. By their resilient nature, slips 58 spring radially inwardly when initially moved downwardly through fish pipe 45. Each of the slips 58 has a plurality of wicker teeth 59 on the radially outward sides thereof which frictionally engage the internal surface of fish pipe 45, as shown. Each of the slips 58 also has a plurality of circumferentially extending tapered slots 60 forming camming surfaces for engagement by the camming surfaces of cam ramps 46, as shown.

In operation, the tool is lowered into the upper end of fish pipe 45 as shown and until contact is made between pipe 45 and pins 44. Thereafter, sub-connector 41 and, hence, cam mandrel 43 are rotated in a counter-clockwise direction. Since slips 58 are frictionally engaging pipe 45, slip ring 54 tends to be held against rotation, thereby causing slip ring 54 to move downwardly relative to mandrel 43. This relative downward movement causes cam ramps 46 to cam slips 58 radially outward and into wedging engagement with pipe 45. With the tool thus secured in pipe 45, the withdrawing and/or jarring of the fish can be commenced. Again, the extent to which slips 58 can become wedged with pipe 45 is limited by the slack fit between threads 52 and 53. This slack fit also permits dislodgement of the tool by rotation of the pipe string supporting the tool in a clockwise direction, the same as with the previous embodiment.

One preferred arrangement for accomplishing the slack fitting relationship of the threads, such as threads 52 and 53, is to provide one of the sets of threads with grooves having longer axial dimensions than the land thereof. This slack fitting relationship thus prevents the fish pipe 45 from splitting by limiting the amount of wedging force provided by slips 58 to pipe 45. If pipe 45 were to become split or expanded beyond certain limits, the removal of the pipe 45 from the well bore might ultimately be completely frustrated. Hence, the arrangement of the present invention to prevent excessive wedging of the slips is an important feature of the invention.

Further modifications may be made in the invention as described without departing from the scope of the invention. Accordingly, the foregoing description is to be construed as illustrative only and is not to be construed as a limitation upon the invention as defined in the following claims.

What is claimed is:

1. In a well fishing tool, the combination comprising:
a cam member having means for attachment to a string of pipe for lowering into a well and rotation thereby, said member having at least one first cam surface along one portion thereof and a threaded portion having a first set of threads spaced axially from said first cam surface;
a slip ring threadably connected to said threaded portion of said cam member by a second set of threads, said first and second sets of threads mating in a slack fitting relationship;
and a plurality of slips resiliently connected to said slip ring, said slips each having at least one second cam surface arranged for generally radial camming engagement by a first cam surface, and a gripping surface on the side radially opposite from said second cam surface, said gripping surfaces being arranged to frictionally engage the fish to be recovered from the well, whereby said slips are engaged with said fish by lowering said tool into the well with the gripping surfaces of said slips adjacent a section of said fish, and cammed into wedging contact therewith by rotation of said string of pipe, with said slack fitting threads controlling the extent of wedging of said slips with said fish during the fishing operation.

2. The invention as claimed in claim 1 wherein:
said cam member is generally tubular in shape.

3. The invention as claimed in claim 1 wherein:
at least one of said first and second sets of threads is arranged with lands and grooves wherein the grooves are wider in axial dimension than the lands, to provide said slack fit.

4. The invention as claimed in claim 3 wherein:
said first and second sets of threads are generally square threads.

5. The invention as claimed in claim 1 wherein:
said cam member is provided with a plurality of annular first cam surfaces;
and said slips are each provided with a plurality of second cam surfaces arranged for engagement and radial camming by said first cam surfaces.

6. The invention as claimed in claim 1 wherein:
said cam member is generally tubular in shape and is provided with said first cam surface and said threaded portion on the internal surface thereof;
and said slip ring and slips are mounted inside said cam member, said slips being dimensioned to spring over and frictionally engage the outside surface of said fish.

7. The invention as claimed in claim 1 wherein:
said cam member is generally cylindrical in shape and is provided with said first cam surface and said threaded portion on the external surface thereof;
and said slip ring and slips are mounted outside said cam member, said slips being dimensioned to spring into and frictionally engage the inside surface of said fish.

8. The invention as claimed in claim 1 including:
stop means for engaging the upper end of said fish during lowering of said tool in the well and thereby positioning said tool adjacent the upper end of said fish.

9. In an over-shot well fishing tool, the combination comprising:
a generally tubular cam member having means for attachment to a string of pipe for lowering into a well and for rotation thereby, said member having at least one cam surface along an internal portion thereof and a set of generally square internal threads around another internal portion thereof;
a slip ring mounted inside said cam member and connected thereto by a set of generally square external threads engaging in slack fitting relation with said internal threads, whereby rotation of said cam member relative to said slip ring causes axial movement therebetween, and with the slackness of the fit of said threads limiting the extent of axial movement therebetween in the absence of rotation;
and a plurality of slips resiliently connected to said slip ring, said slips being dimensioned to slip over the upper end of the fish to be returned, and said slips each having at least one second cam surface on the outside thereof and arranged for radially inward camming engagement by a first cam surface, and each said slip having a gripping surface on the radially inward side thereof for frictionally engaging said fish, whereby said slips are wedged with said fish by lowering said tool into the well with said slips passing over the top end of said fish, and said slips thereafter cammed into wedging contact therewith by rotation of said string of pipe, with said slack fitting threads limiting the extent of wedging of said slips with said fish during the fishing operation.

10. In a spear well fishing tool, the combination comprising:
a generally cylindrical cam member having means for attachment to a string of pipe for lowering into a well and for rotation thereby, said member having at least one cam surface along an external portion thereof and a set of generally square external threads around another external portion thereof;
a slip ring mounted on said cam member and connected thereto by a set of generally square internal threads engaging in slack fitting relationship with said external threads, whereby rotation of said cam member relative to said slip ring causes axial movement therebetween, and with the slackness of the fit of said threads limiting the extent of axial movement therebetween in the absence of rotation;
and a plurality of resilient slips connected to said slip ring, said slips being dimensioned to spring into the upper end of said fish pipe to be retrieved, and said slips each having at least one second cam surface on the radially inward side thereof for frictionally engaging said fish pipe, whereby said slips are wedged with said fish pipe by lowering said tool into the well with said slips passing into the upper end of said fish pipe and said slips thereafter cammed into wedging contact therewith by rotation of said string of pipe, with said slack fitting threads limiting the extent of wedging of said slips with said fish pipe during the fishing operation.

References Cited

UNITED STATES PATENTS

| | | | |
|---|---|---|---|
| 1,427,033 | 8/1922 | Straight | 294—86.16 |
| 1,715,481 | 6/1929 | Ventresca | 294—86.22 |
| 2,058,687 | 10/1936 | Hall et al. | 294—86.22 |
| 3,108,637 | 10/1963 | Lee et al. | 294—86.22 |

EVON C. BLUNK, Primary Examiner

W. S. CARSON, Assistant Examiner

U.S. Cl. X.R.

294—86.31